US012623932B2

(12) United States Patent
Lu et al.

(10) Patent No.: US 12,623,932 B2
(45) Date of Patent: May 12, 2026

(54) DIRECT PRODUCTION OF LITHIUM HYDROXIDE FROM BRINE BY ELECTROCHEMICAL FLOW CELLS

(71) Applicant: THE REGENTS OF THE UNIVERSITY OF MICHIGAN, Ann Arbor, MI (US)

(72) Inventors: Wei Lu, Ann Arbor, MI (US); Tianhan Gao, Ann Arbor, MI (US)

(73) Assignee: THE REGENTS OF THE UNIVERSITY OF MICHIGAN, Ann Arbor, MI (US)

( * ) Notice: Subject to any disclaimer, the term of this patent is extended or adjusted under 35 U.S.C. 154(b) by 896 days.

(21) Appl. No.: 17/897,312

(22) Filed: Aug. 29, 2022

(65) Prior Publication Data

US 2023/0067397 A1 Mar. 2, 2023

Related U.S. Application Data

(60) Provisional application No. 63/237,626, filed on Aug. 27, 2021.

(51) Int. Cl.
*C02F 1/469* (2023.01)
*B01D 61/42* (2006.01)
(Continued)

(52) U.S. Cl.
CPC .......... *C02F 1/4691* (2013.01); *B01D 61/461* (2022.08); *B01D 61/58* (2013.01);
(Continued)

(58) Field of Classification Search
CPC ......... C02F 1/4691; C02F 2201/46115; B01D 61/428; B01D 61/44; B01D 61/46;
(Continued)

(56) References Cited

U.S. PATENT DOCUMENTS 8,641,949 B2 2/2014 Yan et al.
10,648,090 B2 5/2020 Snydacker et al.
(Continued)

OTHER PUBLICATIONS

Palagonia et al. "Lithium recovery from diluted brine by means of electrochemical ion exchange in a flow-through-electrodes cell" Desalination 475 (2020) 114192 (Year: 2020).*
(Continued)

*Primary Examiner* — Luan V Van
*Assistant Examiner* — Alexander R. Parent
(74) *Attorney, Agent, or Firm* — Quarles & Brady LLP

(57) ABSTRACT

Disclosed are a system and methods for producing lithium hydroxide directly from natural brine by an electrochemical approach. In one example version of the system, an electrochemical cell operates in two states. In one state, lithium cations ($Li^+$) intercalate into a first electrode from the brine, and sodium cations ($Na^+$) deintercalate from a second electrode into the brine. In another state, lithium cations deintercalate from the first electrode into a dilute lithium hydroxide (LiOH) solution, and sodium cations intercalate to the second electrode from a concentrated sodium hydroxide (NaOH) solution. Hydroxide anions ($OH^-$) transport through an anion exchange membrane to combine with lithium cations ($Li^+$) to form LiOH, continuously increasing its concentration.

19 Claims, 6 Drawing Sheets

(51) Int. Cl.

| | |
|---|---|
| *B01D 61/46* | (2006.01) |
| *B01D 61/48* | (2006.01) |
| *B01D 61/58* | (2006.01) |
| *C02F 1/461* | (2023.01) |
| *C02F 101/10* | (2006.01) |
| *C02F 103/10* | (2006.01) |
| *C25B 1/16* | (2006.01) |

(52) U.S. Cl.
CPC .......... *B01D 61/428* (2022.08); *B01D 61/485* (2013.01); *B01D 2311/2626* (2013.01); *B01D 2311/2684* (2013.01); *B01D 2315/05* (2013.01); *B01D 2317/06* (2013.01); *B01D 2317/08* (2013.01); *B01D 2321/02* (2013.01); *C02F 1/46109* (2013.01); *C02F 2001/46133* (2013.01); *C02F 2101/10* (2013.01); *C02F 2103/10* (2013.01); *C02F 2201/46115* (2013.01); *C25B 1/16* (2013.01)

(58) Field of Classification Search
CPC .... B01D 61/461; B01D 61/485; B01D 61/58; B01D 2315/05; B01D 2313/083; B01D 2313/48; C25B 1/16; H01M 10/052; H01M 10/0525; C25C 7/00; C25C 7/04
USPC .......................................... 204/539; 205/510
See application file for complete search history.

(56) References Cited

U.S. PATENT DOCUMENTS

| | | | | |
|---|---|---|---|---|
| 2018/0148355 | A1 | 5/2018 | Smith et al. | |
| 2020/0131058 | A1* | 4/2020 | Kim | B01D 61/428 |
| 2020/0399149 | A1* | 12/2020 | Kim | C02F 1/4691 |
| 2021/0078877 | A1* | 3/2021 | Boon | B01D 61/468 |
| 2021/0198124 | A1* | 7/2021 | Metzger | C02F 1/4691 |
| 2021/0246529 | A1 | 8/2021 | Jariwala et al. | |
| 2023/0067116 | A1* | 3/2023 | Christensen | C02F 1/46104 |

OTHER PUBLICATIONS

Li et al. "Faradaic Electrodes Open a New Era for Capacitive Deionization" Adv. Sci. 2020, 7, 2002213 (Year: 2020).*

Mu et al. "Electrochemical lithium recovery from brine with high Mg2+/Li+ ratio using mesoporous A-MnO2/LiMn204 modified 3D graphite felt electrodes" Desalination 511 (2021) 115112 (Year: 2021).*

Chen, X. et al., Production of Lithium Hydroxide by Electrodialysis with Bipolar Membranes, Separation and Purification Technology, 2021, 274:119026, pp. 1-10.

Ebensperger, A. et al., The Lithium Industry: Its Recent Evolution and Future Prospects, Resources Policy, 2005, 30(3):218-231.

Gao, T. et al., Machine Learning Toward Advanced Energy Storage Devices and Systems, iScience, 2021, 24:101936, pp. 1-33.

Grageda, M. et al., Analysis of a Process for Producing Battery Grade Lithium Hydroxide by Membrane Electrodialysis, Membranes, 2020, 10(9): 198, pp. 1-21.

Ha, Y. et al., Continuous Lithium Extraction from Aqueous Solution Using Flow-Electrode Capacitive Deionization, Energies, 2019, 12:2913, pp. 1-10.

Kim, K., Recovery of Lithium Hydroxide from Spent Lithium Carbonate Using Crystallizations, Separation Science and Technology, 2008, 43(2):420-430.

Kim, S. et al., Electrochemical Selective Ion Separation in Capacitive Deionization with Sodium Manganese Oxide, Journal of Colloid and Interface Science, 2017, 506:644-648.

Kim, J. et al., Removal of Calcium Ions from Water by Selective Electrosorption Using Target-Ion Specific Nanocomposite Electrode, Water Research, 2019, 160:445-453.

Mishra, B. et al., Alkali Metals Production (Li, Na, K), Reference Module in Materials Science and Materials Engineering, doi:10.1016/B978-0-12-803581-8.09228-6, 2017, pp. 1-7.

Mu, Y. et al., Electrochemical Lithium Recovery from Brine with High Mg2+/Li+ Ratio Using Mesoporous λ-MnO2/LiMn2O4 Modified 3D Graphite Felt Electrodes, Desalination, 2021, 511:115112, 10 pages.

Opitz, A. et al., Can Li-Ion Batteries be the Panacea for Automotive Applications?, Renewable and Sustainable Energy Reviews, 2017, 68:685-692.

Porada, S. et al., Energy Consumption in Membrane Capacitive Deionization and Comparison with Reverse Osmosis, Desalination, 2020, 488:114383, pp. 1-7.

Ramachandran, A. et al., High Water Recovery and Improved Thermodynamic Efficiency for Capacitive Deionization Using Variable Flowrate Operation, Water Research, 2019, 155:76-85.

Reale, E. et al., Effect of Conductive Additives on the Transport Properties of Porous Flow-Through Electrodes with Insulative Particles and Their Optimization for Faradaic Deionization, Water Research, 2019, 165:114995, pp. 1-10.

Rioyo, J. et al., Lithium Extraction from Spodumene by the Traditional Sulfuric Acid Process: A Review, Mineral Processing and Extractive Metallurgy Review, DOI: 10.1080/08827508.2020.1798234, pp. 1-10.

Romero, V. et al., Electrochemical Flow Reactor for Selective Extraction of Lithium Chloride from Natural Brines, Journal of The Electrochemical Society, 2020, 167:120522, 11 pages.

Romero, V. et al., Sustainable Electrochemical Extraction of Lithium from Natural Brine: Part II. Flow Reactor, Journal of The Electrochemical Society, 2021, 168:020518, 11 pages.

Singh, K. et al., Theory of Water Desalination with Intercalation Materials, Physical Review Applied, 2018, 9:064036, pp. 1-9.

Smith, K. et al., Na-Ion Desalination (NID) Enabled by Na-Blocking Membranes and Symmetric Na-Intercalation: Porous-Electrode Modeling, Journal of The Electrochemical Society, 2016, 163(3):A530-A539.

Smith, K., Theoretical Evaluation of Electrochemical Cell Architectures Using Cation Intercalation Electrodes for Desalination, Electrochimica Acta, 2017, 230:333-341.

Son, M. et al., Improving the Thermodynamic Energy Efficiency of Battery Electrode Deionization Using Flow-Through Electrodes, Environmental Science & Technology, 2020, 54(6):3628-3635.

Suss, M. et al., Water Desalination via Capacitive Deionization: What Is It and What Can We Expect From It?, Energy & Environmental Science, 2015, 8(8):2296-2319.

Swain, B., Recovery and Recycling of Lithium: A Review, Separation and Purification Technology, 2017, 172:388-403.

Xu, W. et al., Lithium Extraction from High Mg/Li Brine Via Electrochemical Intercalation/De-intercalation System Using LiMn2O4 Materials, Desalination, 2021, 503:114935, pp. 1-10.

Zhang, C. et al., Flow Electrode Capacitive Deionization (FCDI): Recent Developments, Environmental Applications, and Future Perspectives, Environmental Science & Technology, 2021, 55(8):4243-4267.

Zhao, R. et al., Energy Consumption and Constant Current Operation in Membrane Capacitive Deionization, Energy & Environmental Science, 2012, 5(11):9520-9527.

Zhao, Y. et al., Preparation of LiOH through BMED Process from Lithium-Containing Solutions: Effects of Coexisting Ions and Competition Between Na+ and Li+, Desalination, 2021, 512:115126, pp. 1-17.

* cited by examiner

DIRECT PRODUCTION OF LITHIUM HYDROXIDE FROM BRINE BY ELECTROCHEMICAL FLOW CELLS

CROSS-REFERENCES TO RELATED APPLICATIONS

This application is based on, claims benefit of, and claims priority to U.S. Application No. 63/237,626 filed on Aug. 27, 2021, which is hereby incorporated by reference herein in its entirety for all purposes.

STATEMENT REGARDING FEDERALLY SPONSORED RESEARCH

Not Applicable.

BACKGROUND OF THE INVENTION

1. Field of the Invention

This invention relates to an electrochemical flow cell system for producing lithium hydroxide directly from natural brine by an electrochemical approach.

2. Description of the Related Art

It is expected that the global demand for lithium will increase dramatically by 2050 to meet the needs for lithium ion batteries. With the widespread adoption and growth of electric vehicles, consumer electronics, and grid-scale battery storage, lithium will become a crucial element in the clean energy supply chain [Ref. 1-4]. Lithium hydroxide NOM is widely used as raw material for manufacturing ternary nickel-rich battery cathodes such as NCA, NMC 622, NMC 811, as well as other chemical products. A major global lithium source is natural geothermal brine, which takes up to 90% of the world's proven lithium reserves. It is vital to produce lithium hydroxide with high purity, and low energy and water consumption from natural geothermal brine, to meet the increasing demand for battery manufacturing.

Traditionally, lithium hydroxide is primarily produced by lithium carbonate [Ref. 5-6], which can be further generated through natural geothermal brine, or through spodumene by sulfuric acid or heating (some typical reactions are shown in Eqs. (1)-(3)) [Ref. 6-8]. However, this method incurs high cost and energy consumption [Ref. 9]. This method also involves many steps so that various middle products are generated, which increases the consumption of resources, generation of waste species, and reduces the purity of produced lithium hydroxide.

$$Li_2O \cdot Al_2O_3 \cdot 4SiO_2 + H_2SO_4 \rightarrow H_2O \cdot Al_2O_3 \cdot 4SiO_2 + Li_2SO_4 \quad (1)$$

$$Li_2SO_4 + Na_2CO_3 \rightarrow Li_2CO_3 + Na_2SO_4 \quad (2)$$

$$Li_2CO_3 + Ca(OH)_2 \rightarrow 2LiOH + CaCO_3 \quad (3)$$

Lithium hydroxide, a key material in the production of lithium ion battery, is receiving ever increasing demands. The current approaches for producing lithium hydroxide from natural geothermal brine have major limitations such as need producing lithium carbonate as a middle step, high energy consumption and pollution, resource waste, and low efficiencies.

Electrodialysis combining with membrane ion-exchange, or the membrane electrodialysis process, has received attention in the last decade since this technology requires fewer steps in producing lithium hydroxide, and can increase efficiency and reduce cost compared with lithium hydroxide production through lithium carbonate. The mechanism of membrane electrodialysis is to generate hydroxide anion by electrolyzing the water solvent, and pass lithium ions in the brine through the membrane to form lithium hydroxide with the generated hydroxide anion. To explore generating lithium hydroxide by this process, Grageda et al. [Ref. 9] investigated the effect of current density, electrode material, electrolyte concentration, temperature, and cationic membrane on the generation performance. They found that the specific energy consumption can be reduced to 7.25 kWh/kg-LiOH at a current density of 1200 A/m² and a temperature between 75-85° C. When the temperature is below 75° C., the product purity can be improved with the Nafion 117 membrane and at a lower electrolyte concentration. Zhao et al. [Ref. 10] used bipolar membrane electrodialysis (BMED) to acquire lithium hydroxide. They investigated the effect of ion properties on the mass transfer behavior of BMED, and the effect of coexisting ions on lithium migration and current efficiency. Chen et al. [Ref. 11] used BMED to generate lithium hydroxide and sulfate acid based on lithium sulfate. They found that the energy consumption can be reduced to ~7 kWh/kg-LiOH when maintaining a low concentration of $H_2SO_4$. These investigations all show that electrodialysis combining with membrane ion-exchange is feasible in generating lithium hydroxide without going through lithium carbonate. However, a major challenge with the electrodialysis procedure is huge water consumption, since the amount of decomposed water needs to be large enough in order to generate sufficient hydroxide anions, which undergo the reactions in Eqs. (4) and (5) or (6). Besides, the energy consumption is still large since the electricity consumed during electrodialysis cannot be recovered within the process itself. Additionally, the electrodialysis procedure often requires the concentration of species in brine to remain in a certain range, which poses higher requirement on brine pre-processing and causes the cost of the whole procedure to be high.

$$2H_2O + 2e^- \rightarrow 2OH^- + H_2 \quad (4)$$

$$2H_2O - 4e^- \rightarrow O_2 + 4H^+ \quad (5)$$

$$2Cl^- - 2e^- \rightarrow Cl_2 \quad (6)$$

Nowadays, electrochemical flow cells are receiving increasing interest for potential use in the area of ion adsorption/desorption and deionization, also known as flow-electrode-based capacitive deionization (FCDI) [Ref. 12]. The setup usually contains a porous cathode, a porous anode, current collectors, flow channels, and ion-exchange membranes if necessary. The applications include desalinating sea water [Ref. 13-17], ion separation and water softening [Ref. 18-19]. The flow cell switches the direction of ion absorption/desorption by changing the electrical charging/discharging direction till the electrode is fully intercalated or deintercalated with ions. Therefore, the energy consumed in one electrochemical step can be released in the subsequent electrochemical step. As a result, the overall energy consumption can be much lower than traditionally used deionization methods such as vaporization or membrane exchange technologies. For instance, the energy consumption of FCDI (or CDI or MCDI, etc.) for deionization or ion exchange can be less than 1 kWh/m³, which is much lower compared with that of conventional reverse osmosis or multistage flash distillation (energy consumption of 2-80 kWh/m$^3$ [Ref. 20-24]. Besides, FCDI also has an advantage of easy assembling [Ref. 23].

Recently, FCDI has been explored for lithium extraction, but most studies have been focusing on evaluating the absorption performances into electrodes. Mu et al. [Ref. 25] studied a flow-type system for lithium recovery from brine with high Mg$^{2+}$/Li$^+$ ratio based on mesoporous $\lambda$-MnO$_2$/LiMn$_2$O$_4$ modified flow-through graphite felt electrodes. They found that lithium can be extracted into the electrode at 75 mg/h per gram LiMn$_2$O$_4$ with an energy consumption of 23.4 Wh/mol. Xu et al. [Ref. 26] considered an electrochemical flow cell of LiMn$_2$O$_4$ (anode)|supporting electrolyte|anionic membrane|brine|Li$_{1-x}$Mn$_2$O$_4$ (cathode). Ha et al. [Ref. 23] investigated the performance of lithium extraction from aqueous solutions by FCDI, and confirmed that FCDI can continuously process desalination. They suggest that the salt removing rate depends on multiple parameters such as feed-flow rate and feed saline concentration. Romero et al. [Ref. 27-28] studied an electrochemical flow cell containing LiMn$_2$O$_4$ anode and Li$_{1-x}$Mn$_2$O$_4$ cathode, and used a numerical model to evaluate the performance. They investigated the impact of several parameters, such as polypyrrole (PPy) to LiMn$_2$O$_4$ (LMO) mass ratio, current and flow rate. These works prove that FCDI can effectively execute the deionization procedure.

However, existing works have only applied FCDI for a single purpose, such as extracting lithium ions from brine into electrodes. The additional processing to utilize the lithium in the electrodes was considered a separate task demanding other techniques, beyond the scope of FCDI.

Therefore, there is a need for an improved process for generating lithium hydroxide with high efficiency and purity, low cost, low energy consumption, low water consumption, as well as low toxic species generation.

SUMMARY OF THE INVENTION

The present disclosure provides an electrochemical flow cell system for producing lithium hydroxide directly from natural brine by an electrochemical approach. What is missing in prior technology is: (1) FCDI technology is only used for lithium extraction into electrodes but has not been applied for further processing of the lithium-containing electrodes; (2) none of the works have used FCDI technology to produce lithium hydroxide compound based on the lithium extracted from brine; and (3) none of the works proposed to use FCDI to achieve lithium extraction and lithium hydroxide production from brine in the same cell. The innovation of the invention is to make a breakthrough in these three areas, achieving what has not been done before.

In one aspect, the present disclosure provides a system for recovery of a first cation (e.g., lithium) from a liquid (e.g., brine) containing the first cation. The system comprises: a first electrode comprising a first cation host material; a second electrode comprising a second cation host material, the first electrode and the second electrode being spaced apart to define a flow channel between the first electrode and the second electrode; an anion exchange membrane that separates the flow channel into a first subchannel of the flow channel and a second subchannel of the flow channel, the first subchannel being in fluid communication with the first electrode, and the second subchannel being in fluid communication with the second electrode; a first tank in fluid communication with an inlet and an outlet of the first subchannel, the first tank storing a first solution containing the first cation, the first solution being transported through the first subchannel; a second tank in fluid communication with an inlet and an outlet of the second subchannel, the second tank storing a second solution containing a second cation (e.g., sodium), the second solution being transported through the second subchannel; and an electrical device in electrical communication with the first electrode and the second electrode to supply a current to the first electrode and the second electrode, wherein the first cation and the second cation are different. The system can further comprise a third tank in fluid communication with an inlet and an outlet of the flow channel, the third tank storing the liquid containing the first cation, the liquid containing the first cation being transported through the flow channel after the first solution is transported through the first subchannel, and the second solution is transported through the second subchannel.

In one embodiment of the system, the liquid is brine. In another embodiment of the system, the liquid is a geothermal brine.

In one embodiment of the system, the first cation is lithium, and the first cation host material is a lithium host material. The lithium host material can comprise lithium manganese oxide or lithium titanium oxide. In another embodiment of the system, the second cation is sodium, and the second cation host material is a sodium host material. The sodium host material comprises sodium manganese oxide or sodium titanium oxide.

In one embodiment of the system, the first solution is lithium hydroxide. In another embodiment of the system, the second solution is sodium hydroxide.

The system can further comprise a fourth tank in fluid communication with the first electrode, the second electrode, the flow channel, the first subchannel, and the second subchannel, the fourth tank storing a wash fluid, the wash fluid being transported through the first electrode, the second electrode, the flow channel, the first subchannel, and the second subchannel after the liquid containing the first cation is transported through the flow channel.

In one embodiment of the system, a door in the anion exchange membrane is opened placing the anion exchange membrane in the second position in which the first subchannel and the second subchannel are in fluid communication.

In one embodiment of the system, the anion exchange membrane allows hydroxide anions to pass though the anion exchange membrane.

In one embodiment of the system, the system generates electricity when the liquid containing the first cation is transported through the flow channel, and the system consumes electricity when the first solution is transported through the first subchannel, and the second solution is transported through the second subchannel.

In one embodiment of the system, the electrical device comprises a storage battery, the system generates electricity that is stored in the storage battery when the liquid containing the first cation is transported through the flow channel, and the system consumes electricity from the storage battery when the first solution is transported through the first subchannel, and the second solution is transported through the second subchannel.

In one embodiment of the system, the electrical device comprises a resistive load and a power supply to supply the current to the first electrode and the second electrode, the system generates electricity that is provided to the resistive load when the liquid containing the first cation is transported through the flow channel, and the system consumes electricity from the power supply when the first solution is transported through the first subchannel, and the second solution is transported through the second subchannel.

In one embodiment, the invention comprises a plurality of systems. In one embodiment, one of the plurality of systems generates electricity during a time period, and another of the plurality of systems consumes electricity generated by the one of the plurality of systems during the time period.

In another aspect, the present disclosure provides a system for recovery of a first cation (e.g., lithium) from a liquid (e.g., brine) containing the first cation. The system comprises: a first electrode comprising a first cation host material; a second electrode comprising a second cation host material, the first electrode and the second electrode being spaced apart to define a flow channel between the first electrode and the second electrode; an anion exchange membrane having a first position in the flow channel that separates the flow channel into a first subchannel of the flow channel and a second subchannel of the flow channel wherein the first subchannel and the second subchannel are not in fluid communication when the anion exchange membrane is in the first position, the anion exchange membrane having a second position in which the first subchannel and the second subchannel are in fluid communication, the first subchannel being in fluid communication with the first electrode, and the second subchannel being in fluid communication with the second electrode, a first tank in fluid communication with an inlet and an outlet of the first subchannel, the first tank storing a first solution containing the first cation, the first solution being transported through the first subchannel when the anion exchange membrane is in the first position; a second tank in fluid communication with an inlet and an outlet of the second subchannel, the second tank storing a second solution containing a second cation (e.g., sodium), the second solution being transported through the second subchannel when the anion exchange membrane is in the first position; a third tank in fluid communication with an inlet and an outlet of the flow channel, the third tank storing the liquid (e.g., brine) containing the first cation, the liquid containing the first cation being transported through the flow channel when the anion exchange membrane is in the second position; and an electrical device in electrical communication with the first electrode and the second electrode to supply a current to the first electrode and the second electrode.

In one embodiment of the system, the liquid is brine. In another embodiment of the system, the liquid is a geothermal brine.

In one embodiment of the system, the first cation is lithium, and the first cation host material is a lithium host material. The lithium host material can comprise lithium manganese oxide or lithium titanium oxide. In another embodiment of the system, the second cation is sodium, and the second cation host material is a sodium host material. The sodium host material comprises sodium manganese oxide or sodium titanium oxide.

In one embodiment of the system, the first solution is lithium hydroxide. In another embodiment of the system, the second solution is sodium hydroxide.

The system can further comprise a fourth tank in fluid communication with the first electrode, the second electrode, the flow channel, the first subchannel, and the second subchannel, the fourth tank storing a wash fluid, the wash fluid being transported through the first electrode, the second electrode, the flow channel, the first subchannel, and the second subchannel after the liquid containing the first cation is transported through the flow channel.

In one embodiment of the system, a door in the anion exchange membrane is opened placing the anion exchange membrane in the second position in which the first subchannel and the second subchannel are in fluid communication.

In one embodiment of the system, the anion exchange membrane allows hydroxide anions to pass though the anion exchange membrane.

In one embodiment of the system, the system generates electricity when the liquid containing the first cation is transported through the flow channel, and the system consumes electricity when the first solution is transported through the first subchannel, and the second solution is transported through the second subchannel.

In one embodiment of the system, the electrical device comprises a storage battery, the system generates electricity that is stored in the storage battery when the liquid containing the first cation is transported through the flow channel, and the system consumes electricity from the storage battery when the first solution is transported through the first subchannel, and the second solution is transported through the second subchannel.

In one embodiment of the system, the electrical device comprises a resistive load and a power supply to supply the current to the first electrode and the second electrode, the system generates electricity that is provided to the resistive load when the liquid containing the first cation is transported through the flow channel, and the system consumes electricity from the power supply when the first solution is transported through the first subchannel, and the second solution is transported through the second subchannel.

In one embodiment, the invention comprises a plurality of systems. In one embodiment, one of the plurality of systems generates electricity during a time period, and another of the plurality of systems consumes electricity generated by the one of the plurality of systems during the time period.

In yet another aspect, the present disclosure provides a method for recovering first cations (e.g., lithium cations) from a liquid (e.g., brine) containing the first cations. The method includes the steps of: (a) providing a cell including: (i) a first electrode comprising a first cation host material, (ii) a second electrode comprising a second cation host material for intercalating and deintercalating second cations, the first electrode and the second electrode being spaced apart to define a flow channel between the first electrode and the second electrode, and (iii) an electrical device in electrical communication with the first electrode and the second electrode to supply a current to the first electrode and the second electrode; (b) transporting the liquid (e.g., brine) containing the first cations (e.g., lithium cations) through the flow channel such that at least a portion of the first cations intercalate into the first cation host material; (c) separating the flow channel with an anion exchange membrane into a first subchannel of the flow channel and a second subchannel of the flow channel such that the first subchannel and the second subchannel are not in fluid communication, wherein the first subchannel is in fluid communication with the first electrode, and wherein the second subchannel is in fluid communication with the second electrode; and (d) transporting a first solution through the first subchannel such that the portion of the first cations deintercalate from the first electrode into the first solution creating a first cation enriched solution. The method can further comprise: (e) separating a salt of the first cation from the first cation enriched solution by a process such as evaporation.

In one embodiment of the method, the liquid is brine. In another embodiment of the method, the liquid is a geothermal brine.

In one embodiment of the method, the first cations are lithium cations, and the first cation host material is a lithium host material. The lithium host material can comprise lithium manganese oxide or lithium titanium oxide.

In one embodiment of the method, the second cations are sodium cations, and the second cation host material is a sodium host material. The sodium host material can comprise sodium manganese oxide or sodium titanium oxide.

In one embodiment of the method, the first solution is lithium hydroxide.

The method can further comprise transporting a second solution including the second cations through the second subchannel such that a portion of the second cations intercalate into the second electrode from the second solution. The second solution can be sodium hydroxide.

In one embodiment of the method, the anion exchange membrane allows hydroxide anions to pass though the anion exchange membrane.

In one embodiment of the method, transporting the first solution through the first subchannel is ceased when an average state of charge of the first electrode decreases to a first threshold state of charge.

In one embodiment of the method, transporting the first solution through the first subchannel is ceased when an average state of charge of the second electrode increases to a second threshold state of charge.

In one embodiment of the method, transporting the first solution through the first subchannel is ceased when an amount of first cations in the first cation enriched solution reaches a predetermined value.

In one embodiment of the method, transporting the liquid containing the first cations is ceased when an average state of charge of the first electrode increases to a first threshold state of charge.

In one embodiment of the method, transporting the liquid containing the first cations is ceased when an average state of charge of the second electrode decreases to a second threshold state of charge.

In one embodiment of the method, step (b) and step (d) are performed at a temperature in a range of 20° C. to 100° C. Step (b) can be performed at a temperature in a range of 20° C. to 100° C. In one embodiment of the method, steps (b), (c) and (d) are repeated.

In another embodiment of the method, the electrical device comprises a storage battery, the cell generates electricity in step (b) that is stored in the storage battery, and the cell consumes electricity from the storage battery in step (d). In one embodiment of the method, steps (a) and (b) are repeated.

In one embodiment of the method, the electrical device comprises a storage battery, the cell generates electricity in step (a) that is stored in the storage battery, and the cell consumes electricity from the storage battery in step (b).

The method can further comprise removing cations other than the first cations from the liquid containing the first cations before transporting the liquid containing the first cations through the flow channel. The method can further comprise acidifying the liquid containing the first cations.

The method can further comprise providing a plurality of the cells, wherein one of the plurality of cells generates electricity during a time period, and another of the plurality of cells consumes electricity generated by the one of the plurality of cells during the time period.

In still another aspect, the present disclosure provides a method for recovering first cations (e.g., lithium cations) from a liquid (e.g., brine) containing the first cations. The method includes the steps of: (a) providing a cell including: (i) a first electrode comprising a first cation host material and an amount of first cations intercalated into the first cation host material, (ii) a second electrode comprising a second cation host material for intercalating and deintercalating second cations (e.g., sodium cations), the first electrode and the second electrode being spaced apart to define a flow channel between the first electrode and the second electrode, (iii) an anion exchange membrane separating the flow channel into a first subchannel and a second subchannel such that the first subchannel and the second subchannel are not in fluid communication, and (iv) an electrical device in electrical communication with the first electrode and the second electrode to supply a current to the first electrode and the second electrode; and (b) transporting a first solution through the first subchannel such that the amount of first cations deintercalate from the first electrode into the first solution creating a first cation enriched solution, wherein the first cations and the second cations are different. In the method, step (a) can further comprise transporting a liquid (e.g., brine) containing the first cations (e.g., lithium cations) through the flow channel such that the amount of first cations intercalate into the first cation host material. The method can further comprise: (e) separating a salt of the first cation from the first cation enriched solution by a process such as evaporation.

In one embodiment of the method, the liquid is brine. In another embodiment of the method, the liquid is a geothermal brine.

In one embodiment of the method, the first cations are lithium cations, and the first cation host material is a lithium host material. The lithium host material can comprise lithium manganese oxide or lithium titanium oxide.

In one embodiment of the method, the second cations are sodium cations, and the second cation host material is a sodium host material. The sodium host material can comprise sodium manganese oxide or sodium titanium oxide.

In one embodiment of the method, the first solution is lithium hydroxide.

The method can further comprise transporting a second solution including the second cations through the second subchannel such that a portion of the second cations intercalate into the second electrode from the second solution. The second solution can be sodium hydroxide.

In one embodiment of the method, the anion exchange membrane allows hydroxide anions to pass though the anion exchange membrane.

In one embodiment of the method, transporting the first solution through the first subchannel is ceased when an average state of charge of the first electrode decreases to a first threshold state of charge.

In one embodiment of the method, transporting the first solution through the first subchannel is ceased when an average state of charge of the second electrode increases to a second threshold state of charge.

In one embodiment of the method, transporting the first solution through the first subchannel is ceased when an amount of first cations in the first cation enriched solution reaches a predetermined value.

In one embodiment of the method, transporting the liquid containing the first cations is ceased when an average state of charge of the first electrode increases to a first threshold state of charge.

In one embodiment of the method, transporting the liquid containing the first cations is ceased when an average state of charge of the second electrode decreases to a second threshold state of charge.

In one embodiment of the method, step (b) and step (d) are performed at a temperature in a range of 20° C. to 100° C.

Step (b) can be performed at a temperature in a range of 20° C. to 100° C. In one embodiment of the method, steps (b), (c) and (d) are repeated.

In another embodiment of the method, the electrical device comprises a storage battery, the cell generates electricity in step (b) that is stored in the storage battery, and the cell consumes electricity from the storage battery in step (d). In one embodiment of the method, steps (a) and (b) are repeated.

In one embodiment of the method, the electrical device comprises a storage battery, the cell generates electricity in step (a) that is stored in the storage battery, and the cell consumes electricity from the storage battery in step (b).

The method can further comprise removing cations other than the first cations from the liquid containing the first cations before transporting the liquid containing the first cations through the flow channel. The method can further comprise acidifying the liquid containing the first cations.

The method can further comprise providing a plurality of the cells, wherein one of the plurality of cells generates electricity during a time period, and another of the plurality of cells consumes electricity generated by the one of the plurality of cells during the time period.

These and other features, aspects, and advantages of the present disclosure will become better understood upon consideration of the following detailed description, drawings, and appended claims.

BRIEF DESCRIPTION OF THE DRAWINGS

Like reference numerals will be used to refer to like parts from Figure to Figure in the following description of the drawings.

DETAILED DESCRIPTION OF THE INVENTION

Figure 1:
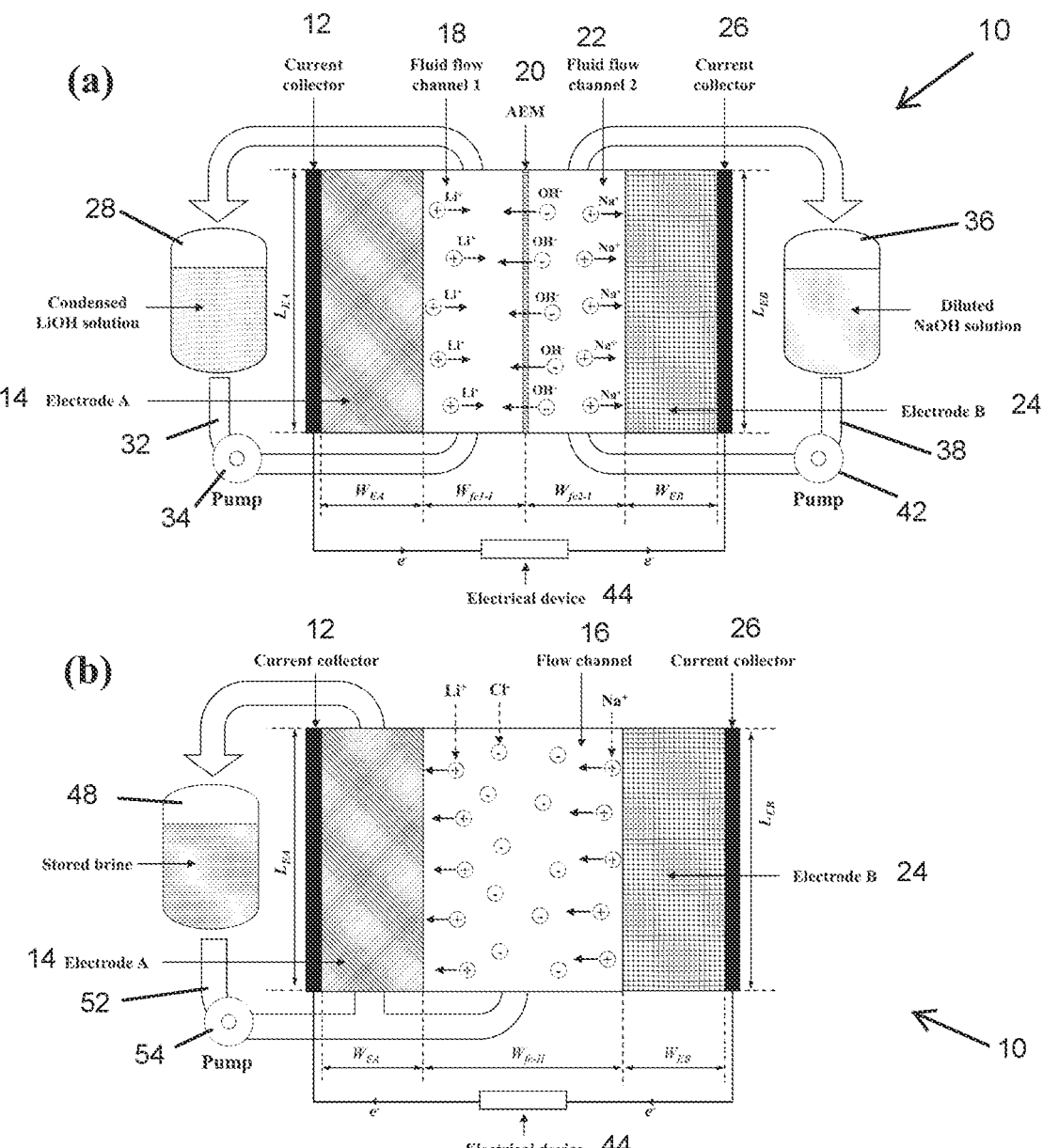
FIG. 1 is a schematic of a configuration of an example system according to the invention, wherein panel (a) shows state 1: LiOH production, and panel (b) shows state 2: lithium extraction from brine.

Before the present invention is described in further detail, it is to be understood that the invention is not limited to the particular embodiments described. It is also to be understood that the terminology used herein is for the purpose of describing particular embodiments only, and is not intended to be limiting. The scope of the present invention will be limited only by the claims. As used herein, the singular forms "a", "an", and "the" include plural embodiments unless the context clearly dictates otherwise.

It should be apparent to those skilled in the art that many additional modifications beside those already described are possible without departing from the inventive concepts. In interpreting this disclosure, all terms should be interpreted in the broadest possible manner consistent with the context. Variations of the term "comprising", "including", or "having" should be interpreted as referring to elements, components, or steps in a non-exclusive manner, so the referenced elements, components, or steps may be combined with other elements, components, or steps that are not expressly referenced. Embodiments referenced as "comprising", "including", or "having" certain elements are also contemplated as "consisting essentially of" and "consisting of" those elements, unless the context clearly dictates otherwise. It should be appreciated that aspects of the disclosure that are described with respect to a system are applicable to the methods, and vice versa, unless the context explicitly dictates otherwise.

Numeric ranges disclosed herein are inclusive of their endpoints. For example, a numeric range of between 1 and 10 includes the values 1 and 10. When a series of numeric ranges are disclosed for a given value, the present disclosure expressly contemplates ranges including all combinations of the upper and lower bounds of those ranges. For example, a numeric range of between 1 and 10 or between 2 and 9 is intended to include the numeric ranges of between 1 and 9 and between 2 and 10.

An electrochemical system of the present disclosure allows for extracting lithium to form lithium hydroxide (a lithium precursor) from various recourses such as geothermal brines. In one embodiment, the electrochemical system includes an electrochemical flow cell comprising two electrodes, a first electrode A for lithium ions intercalation/deintercalation and a second electrode B for sodium ions intercalation/deintercalation. At the beginning, electrode A is mostly depleted of lithium ions and electrode B is mostly filled with sodium ions. In stage 1, brines flow through the cell. Lithium ions are extracted from brines and intercalate into electrode A. Gradually, electrode A becomes filled with lithium ions. At the same time, sodium ions deintercalate from electrode B and move into the solution. Gradually, electrode B becomes depleted of sodium ions. In stage 2, sodium hydroxide solution flows through the cell. Lithium ions deintercalate from electrode A to the solution. The solution becomes lithium hydroxide. Gradually, electrode A becomes depleted of lithium ions. At the same time, sodium ions intercalate into electrode B. Gradually, electrode B becomes filled with sodium ions. In stage 2, concentrated lithium hydroxide is produced. The process is repeated for stages 1 and 2 to continuously produce lithium hydroxide. Building on this setup, other configurations, such as a three stage processing with an additional electrode can also be used.

In one embodiment, there is provided a system for recovery of a first cation (e.g., lithium) from a liquid (e.g., brine) containing the first cation. The system comprises: a first electrode comprising a first cation host material; a second electrode comprising a second cation host material, the first electrode and the second electrode being spaced apart to define a flow channel between the first electrode and the second electrode; an anion exchange membrane that separates the flow channel into a first subchannel of the flow channel and a second subchannel of the flow channel, the first subchannel being in fluid communication with the first electrode, and the second subchannel being in fluid communication with the second electrode; a first tank in fluid communication with an inlet and an outlet of the first subchannel, the first tank storing a first solution containing the first cation, the first solution being transported through the first subchannel; a second tank in fluid communication with an inlet and an outlet of the second subchannel, the second tank storing a second solution containing a second cation (e.g., sodium), the second solution being transported through the second subchannel; and an electrical device in electrical communication with the first electrode and the second electrode to supply a current to the first electrode and the second electrode, wherein the first cation and the second cation are different. The system can further comprise a third tank in fluid communication with an inlet and an outlet of the flow channel, the third tank storing the liquid containing the first cation, the liquid containing the first cation being transported through the flow channel after the first solution is transported through the first subchannel, and the second solution is transported through the second subchannel.

In another embodiment, there is provided a system for recovery of a first cation (e.g., lithium) from a liquid (e.g., brine) containing the first cation. The system comprises: a first electrode comprising a first cation host material; a second electrode comprising a second cation host material, the first electrode and the second electrode being spaced apart to define a flow channel between the first electrode and the second electrode; an anion exchange membrane having a first position in the flow channel that separates the flow channel into a first subchannel of the flow channel and a second subchannel of the flow channel wherein the first subchannel and the second subchannel are not in fluid communication when the anion exchange membrane is in the first position, the anion exchange membrane having a second position in which the first subchannel and the second subchannel are in fluid communication, the first subchannel being in fluid communication with the first electrode, and the second subchannel being in fluid communication with the second electrode, a first tank in fluid communication with an inlet and an outlet of the first subchannel, the first tank storing a first solution containing the first cation, the first solution being transported through the first subchannel when the anion exchange membrane is in the first position; a second tank in fluid communication with an inlet and an outlet of the second subchannel, the second tank storing a second solution containing a second cation (e.g., sodium), the second solution being transported through the second subchannel when the anion exchange membrane is in the first position; a third tank in fluid communication with an inlet and an outlet of the flow channel, the third tank storing the liquid (e.g., brine) containing the first cation, the liquid containing the first cation being transported through the flow channel when the anion exchange membrane is in the second position; and an electrical device in electrical communication with the first electrode and the second electrode to supply a current to the first electrode and the second electrode.

In these embodiments of a system for recovery of a first cation from a liquid containing the first cation, the liquid can be a geothermal brine. The first cation can be lithium, and the first cation host material can be a lithium host material, such as lithium manganese oxide or lithium titanium oxide. The second cation can be sodium, and the second cation host material can be a sodium host material, such as sodium manganese oxide or sodium titanium oxide. The first solution can be lithium hydroxide, and the second solution can be sodium hydroxide.

These embodiments of a system for recovery of a first cation from a liquid containing the first cation can further comprise a fourth tank in fluid communication with the first electrode, the second electrode, the flow channel, the first subchannel, and the second subchannel, wherein the fourth tank stores a wash fluid (e.g. water), the wash fluid being transported through the first electrode, the second electrode, the flow channel, the first subchannel, and the second subchannel after the liquid containing the first cation is transported through the flow channel. A door in the anion exchange membrane can be opened placing the anion exchange membrane in the second position in which the first subchannel and the second subchannel are in fluid communication. The anion exchange membrane allows hydroxide anions to pass though the anion exchange membrane.

In these embodiments of a system for recovery of a first cation from a liquid containing the first cation, the system can generate electricity when the liquid (e.g., brine) containing the first cation is transported through the flow channel, and the system consumes electricity when the first solution (e.g., lithium hydroxide) is transported through the first subchannel, and the second solution (e.g., sodium hydroxide) is transported through the second subchannel. The electrical device can comprise a storage battery, and the system generates electricity that is stored in the storage battery when the liquid containing the first cation is transported through the flow channel, and the system consumes electricity from the storage battery when the first solution is transported through the first subchannel, and the second solution is transported through the second subchannel. Alternatively, the electrical device can comprise a resistive load and a power supply to supply the current to the first electrode and the second electrode, and the system generates electricity that is provided to the resistive load when the liquid containing the first cation is transported through the flow channel, and the system consumes electricity from the power supply when the first solution is transported through the first subchannel, and the second solution is transported through the second subchannel.

In one embodiment of the invention, there is provided a system comprising a plurality of systems. One of the plurality of systems can generate electricity during a time period, and another of the plurality of systems consumes electricity generated by the one of the plurality of systems during the time period.

In another embodiment, there is provided a method for recovering first cations (e.g., lithium cations) from a liquid (e.g., brine) containing the first cations. The method includes the steps of: (a) providing a cell including: (i) a first electrode comprising a first cation host material, (ii) a second electrode comprising a second cation host material for intercalating and deintercalating second cations, the first electrode and the second electrode being spaced apart to define a flow channel between the first electrode and the second electrode, and (iii) an electrical device in electrical communication with the first electrode and the second electrode to supply a current to the first electrode and the second electrode; (b) transporting the liquid (e.g., brine) containing the first cations (e.g., lithium cations) through the flow channel such that at least a portion of the first cations intercalate into the first cation host material; (c) separating the flow channel with an anion exchange membrane into a first subchannel of the flow channel and a second subchannel of the flow channel such that the first subchannel and the second subchannel are not in fluid communication, wherein the first subchannel is in fluid communication with the first electrode, and wherein the second subchannel is in fluid communication with the second electrode; and (d) transporting a first solution through the first subchannel such that the portion of the first cations deintercalate from the first electrode into the first solution creating a first cation enriched solution. The method can further comprise: (e) separating a salt of the first cation from the first cation enriched solution by a process such as evaporation.

In another embodiment, there is provided a method for recovering first cations (e.g., lithium cations) from a liquid (e.g., brine) containing the first cations. The method includes the steps of: (a) providing a cell including: (i) a first electrode comprising a first cation host material and an amount of first cations intercalated into the first cation host material, (ii) a second electrode comprising a second cation host material for intercalating and deintercalating second cations (e.g., sodium cations), the first electrode and the second electrode being spaced apart to define a flow channel between the first electrode and the second electrode, (iii) an anion exchange membrane separating the flow channel into a first subchannel and a second subchannel such that the first subchannel and the second subchannel are not in fluid communication, and (iv) an electrical device in electrical communication with the first electrode and the second electrode to supply a current to the first electrode and the second electrode; and (b) transporting a first solution through the first subchannel such that the amount of first cations deintercalate from the first electrode into the first solution creating a first cation enriched solution, wherein the first cations and the second cations are different. In the method, step (a) can further comprise transporting a liquid (e.g., brine) containing the first cations (e.g., lithium cations) through the flow channel such that the amount of first cations intercalate into the first cation host material. The method can further comprise: (e) separating a salt of the first cation from the first cation enriched solution by a process such as evaporation.

In these embodiments of a method for recovering first cations from a liquid containing the first cations, the liquid can be a geothermal brine. The first cations can be lithium cations, and the first cation host material can be a lithium host material, such as lithium manganese oxide or lithium titanium oxide. The second cations can be sodium cations, and the second cation host material can be a sodium host material, such as sodium manganese oxide or sodium titanium oxide. The first solution can be lithium hydroxide. These embodiments of a method for recovering first cations from a liquid containing the first cations can further comprise transporting a second solution including the second cations through the second subchannel such that a portion of the second cations intercalate into the second electrode from the second solution. The second solution can be sodium hydroxide. In these embodiments of a method for recovering first cations from a liquid containing the first cations, the anion exchange membrane allows hydroxide anions to pass though the anion exchange membrane.

In these embodiments of a method for recovering first cations from a liquid containing the first cations, transporting the first solution through the first subchannel can be ceased when an average state of charge of the first electrode decreases to a first threshold state of charge, or transporting the first solution through the first subchannel is ceased when an average state of charge of the second electrode increases to a second threshold state of charge, or transporting the first solution through the first subchannel is ceased when an amount of first cations in the first cation enriched solution reaches a predetermined value. In these embodiments of a method for recovering first cations from a liquid containing the first cations, transporting the liquid containing the first cations can be ceased when an average state of charge of the first electrode increases to a first threshold state of charge, or transporting the liquid containing the first cations can be ceased when an average state of charge of the second electrode decreases to a second threshold state of charge.

In these embodiments of a method for recovering first cations from a liquid containing the first cations, the step of transporting the liquid (e.g., brine) containing the first cations (e.g., lithium cations) through the flow channel such that at least a portion of the first cations intercalate into the first cation host material, and the step of transporting a first solution (e.g., lithium hydroxide) through the first subchannel such that the portion of the first cations deintercalate from the first electrode into the first solution creating a first cation enriched solution can be repeated, and can be performed at a temperature in a range of 20° C. to 100° C., or 40° C. to 100° C., or 60° C. to 100° C., or 70° C. to 90° C. In these embodiments of a method for recovering first cations from a liquid containing the first cations, energy consumed in the step of transporting a first solution (e.g., lithium hydroxide) through the first subchannel can be recovered in the step transporting the liquid (e.g., brine) containing the first cations (e.g., lithium cations) through the flow channel. For example, the electrical device can comprise a storage battery, and the cell generates electricity during the step of transporting the liquid (e.g., brine) containing the first cations (e.g., lithium cations) through the flow channel that is stored in the storage battery, and the cell consumes electricity during transporting a first solution (e.g., lithium hydroxide) through the first subchannel such that the portion of the first cations deintercalate from the first electrode into the first solution creating a first cation enriched solution.

These embodiments of a method for recovering first cations from a liquid containing the first cations can further comprise: providing a plurality of the cells, wherein one of the plurality of cells generates electricity during a time period, and another of the plurality of cells consumes electricity generated by the one of the plurality of cells during the time period. Thus, energy consumed in the step of transporting a first solution (e.g., lithium hydroxide) through the first subchannel in one of the plurality of cells can be recovered in the step transporting the liquid (e.g., brine) containing the first cations (e.g., lithium cations) through the flow channel in another of the plurality of cells.

These embodiments of a method for recovering first cations from a liquid containing the first cations can further comprise removing cations (e.g., $Fe^{3+}$, $Mg^{2+}$, and $Ca^{2+}$) other than the first cations (e.g., lithium cations) from the liquid (e.g., brine) containing the first cations before transporting the liquid containing the first cations through the flow channel. These embodiments of a method for recovering first cations from a liquid containing the first cations can further comprise acidifying the liquid containing the first cations.

EXAMPLE

The following Example is provided in order to demonstrate and further illustrate certain embodiments and aspects of the present invention and is not to be construed as limiting the scope of the invention.

1. Overview of Example

Lithium hydroxide, a key material in the production of lithium ion battery, is receiving ever increasing demands. The current approaches for producing lithium hydroxide from natural geothermal brine have major limitations such as need producing lithium carbonate as a middle step, high energy consumption and pollution, resource waste, and low efficiencies. In this Example, a novel electrochemical flow cell system is developed for producing lithium hydroxide directly from natural brine by an electrochemical approach. The cell operates in two states: State (1) comprises lithium hydroxide generation. At this state, $Li^+$ deintercalates from electrode A into a dilute LiOH solution and $Na^+$ intercalates to electrode B from a concentrated NaOH solution. $OH^-$ transports through an anion exchange membrane (AEM) to combine with $Li^+$ to form LiOH, continuously increasing its concentration. State (2) comprises lithium extraction from brine. At this state, $Li^+$ intercalates into electrode A from the brine and $Na^+$ deintercalates from electrode B into the brine. The energy consumed in state 1 will be recovered in state 2. These two states are repeated to continuously produce lithium hydroxide. We analyzed the effects of designing parameters, including species concentration, temperature, and flow characteristic on the system performance which is quantified by energy consumption/recovery, specific energy consumption, and processing time. We found that this electrochemical system can concurrently achieve both lithium extraction and lithium hydroxide production in the same cell. The energy consumption is low, only on the order of 0.15 kWh/kg-LiOH. The designing parameters, particularly temperature, can significantly influence the performance in each state. This Example provides a novel approach that integrates lithium hydroxide generation and lithium extraction from brine. This approach can generate LiOH with high efficiency and purity, low cost, low energy consumption, low water consumption, as well as low toxic species generation. It is thus highly valuable for producing next-generation lithium battery materials.

2. System Configuration

Our invention is a novel electrochemical flow cell system 10 that delivers continuous, integrated lithium extraction from brine and lithium hydroxide production within the same cell (see FIG. 1). The system has low energy and water consumption, low waste product generation, and produces lithium hydroxide with high purity. The system comprises two electrodes, electrode A 14 for lithium ion intercalation/deintercalation and electrode B 24 for sodium ion intercalation/deintercalation. Electrode 14 contacts current collector 12, and electrode 24 contacts current collector 26. The current collectors 12 and 26 are in electrical communication with an electrical device 44. The electrical device 44 can be a battery. Alternatively, the electrical device 44 can include a power supply and a resistive load. The system 10 also includes pumps, flow pipes and valves for controlling fluid flow and wastewater storage. The electrochemical cells can be arranged into various parallel and/or serial configurations.

In FIG. 1, panel (b), a flow channel 16 is positioned between the electrode 14 and the electrode 24. In FIG. 1, panel (a), an anion exchange membrane 20 separates the flow channel 16 into a first flow subchannel 18 and a second subchannel 22. In the lithium hydroxide production state (state 1) as shown in FIG. 1, panel (a), the first flow subchannel 18 adjacent to electrode A 14 is filled with diluted LiOH solution supplied from a first tank 28 via a conduit 32 and pump 34, and the second subchannel 22 adjacent to electrode B 24 is filled with condensed NaOH solution from a second tank 36 via a conduit 38 and pump 42. Electrode A 14 releases lithium ions while electrode B 24 absorbs sodium ions. Hydroxide anion transport through the anion exchange membrane 20 to combine with the released lithium ions to generate more lithium hydroxide. After the lithium ions in electrode A 14 are fully released, the lithium extraction state (state 2) can be started. In this state, a door on the anion exchange membrane 20 opens. Brine is injected into the first flow subchannel 18 and the second subchannel 22 as shown in FIG. 1, panel (b). The brine is supplied from a third tank 48 via a conduit 52 and pump 54. Electrode A 14 begins to extract lithium ions from the brine, and electrode B 24 begins to release sodium ions absorbed in the previous state until electrode A 14 is high with lithium ions. Then the system 10 is ready for the lithium hydroxide production state again. The invented system 10 can produce LiOH and extract lithium within the same cell to continuously produce LiOH. The electrical energy from the electrical device 44 (e.g., a storage battery) that is consumed in state 1 will be recovered in state 2 as the current generated in state 2 can be used to recharge the electrical device 44 (e.g., the storage battery), leading to very low net energy consumption. Alternatively, a power supply of the electrical device 44 can supply current that is consumed in state 1 of the system 10, and the current generated in state 2 can be provided to a resistive load of the electrical device 44.

Figure 1A:
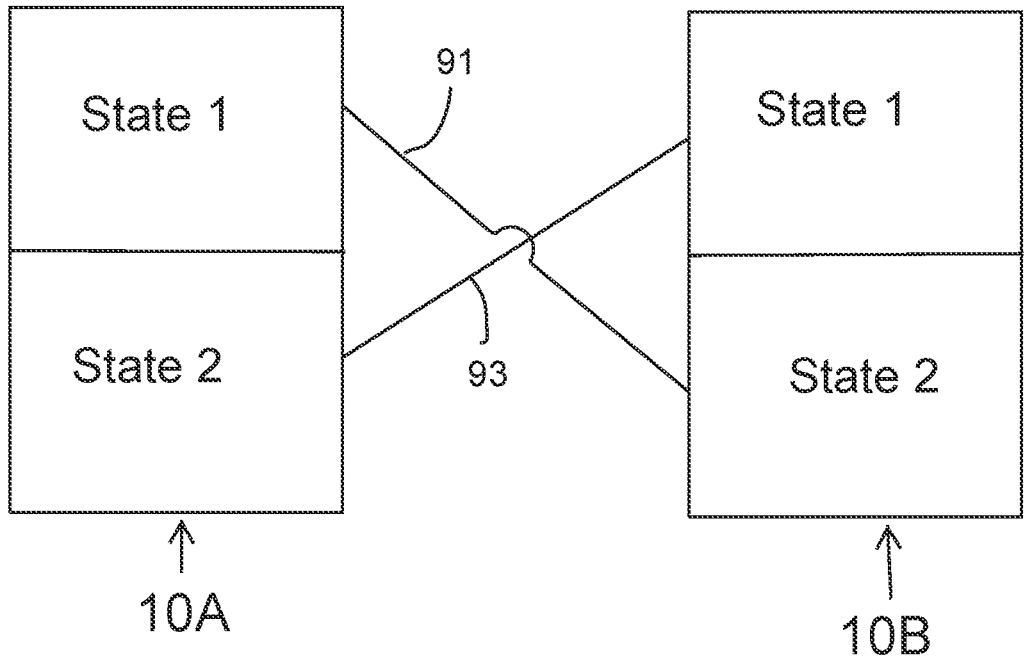
FIG. 1A is a schematic of a configuration of another example system according to the invention which includes two of the systems of FIG. 1 connected by two circuit paths.

In practical applications, multiple systems 10 as shown in FIG. 1 can be connected in parallel without the use of a storage battery. FIG. 1A shows an example embodiment that involves two systems 10A and 10B (each identical to system 10 of FIG. 1) that operate in a "rocking chair" fashion. When system 10A extracts lithium, the other system 10B produces lithium hydroxide. When system 10B extracts lithium, the other system 10A produces lithium hydroxide. The two systems 10A, 10B can help power each other, leading to very low net energy consumption. In stage 1, system 10A extracts lithium from brine (State 2) and transfers electrical current via circuit path 93 to system 10B which produces lithium hydroxide (State 1) using the current generated by system 10A during lithium extraction from brine. In stage 2, system 10B extracts lithium from brine (State 2) and transfers electrical current via circuit path 91 to system 10A which produces lithium hydroxide (State 1) using the current generated by system 10B during lithium extraction from brine. In the embodiment of FIG. 1A, the electrical device providing current to the electrodes is the circuit path 91 or 93 between the systems 10A, 10B. The systems of the invention may include one cell as in FIG. 1, or a plurality (i.e., two or more) of cells as in FIG. 1A.

3. Operation

Figure 2:
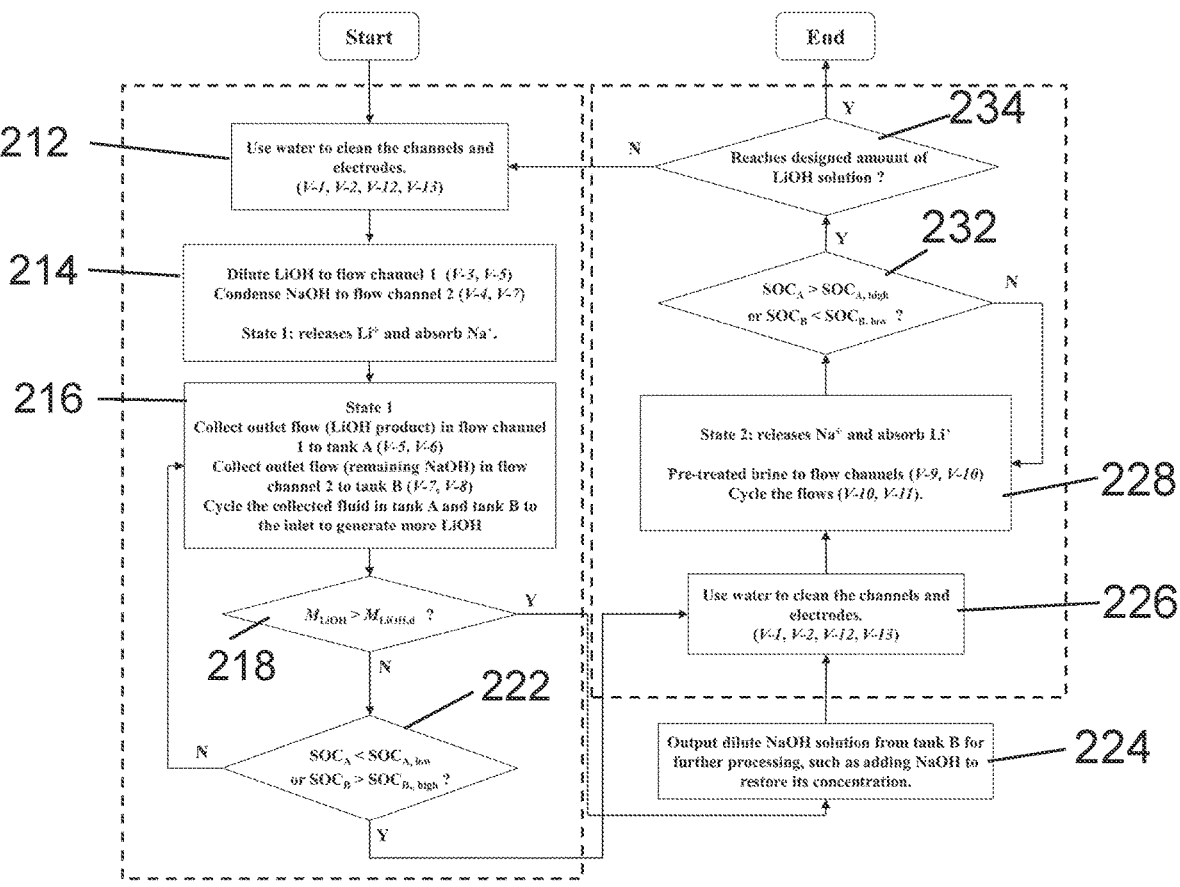
FIG. 2 shows a flowchart of lithium hydroxide production from brine by an electrochemical flow cell system of FIG. 1. V-1 to V-13 are valve numbers in FIG. 3.
Figure 3:
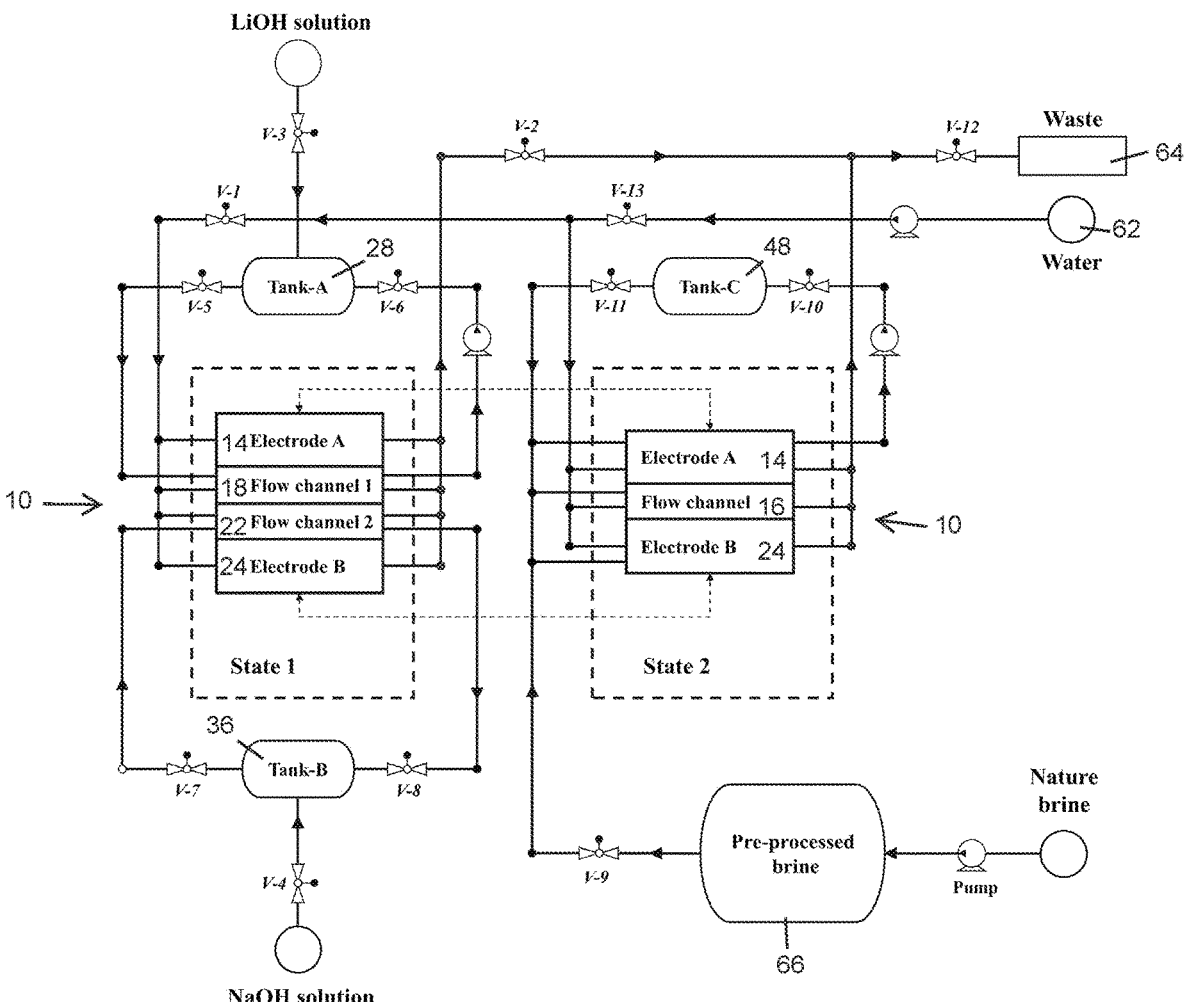
FIG. 3 shows a schematic diagram showing the fluid flow control in the lithium extraction and hydroxide production electrochemical system of FIG. 1. V-1 to V-13 are valve numbers.

The system operation of system 10 is shown in the flowchart in FIG. 2. The fluid flow path and control are shown in FIG. 3. For clarity, state 1 and state 2 of the cell are shown separately in FIG. 2, though physically they belong to the same cell. Some of the water valves such V-1 and V-13 can refer to the same physical valve, but to distinguish between the two states we give them separate valve numbers.

Before the electrochemical procedure, the nature geothermal brine undergoes pre-processing to remove impurities (such as undissolvable sand, stone, oil, etc.) and to remove $Fe^{3+}$, $Mg^{2+}$, and $Ca^{2+}$ etc. (e.g., by adding chemicals to form precipitates). Otherwise, these ions may later form precipitates such as $Fe(OH)_3$, $Mg(OH)_2$ or $Ca(OH)_2$ during operation, which may block the porous electrodes. Then the pre-processed brine is acidified by adding hydrochloric acid. In state 1, pure water from water source 62 firstly flows into the electrochemical system 10 to wash the electrodes 14 and 24 and channels 16, 18, 22 (see FIG. 2, step 212). Then valves V-3 and V-5 are opened to let dilute lithium hydroxide solution (low LiOH concentration) flow into first flow subchannel 18 (see FIG. 2, step 214). This first flow subchannel 18 appears in FIG. 1, panel (a) as the channel next to electrode A 14: the solution flows in at the bottom and flows out at the top. Valves V-4 and V-7 are opened to let condensed sodium hydroxide solution (high NaOH concentration) flow into the second subchannel 22 (see FIG. 2, step 214). This second subchannel 22 appears in FIG. 1, panel (a) as the channel next to electrode B 24: the solution flows in at the bottom and flows out at the top. After the electrochemical cell is filled with LiOH and NaOH solutions, valves V-3 and V-4 are closed so that the flow circulates and the cell enters state 1. Electrode A 14 is initially high in lithium and serves as a lithium reservoir in this state. Electrode B 24 (e.g., black phosphorus, NTO, or NMO electrodes) is initially low in sodium. The anion exchange membrane 20 only allows hydroxide anions (OH$^-$) to pass though, and blocks lithium cations. At state 1, the cell undergoes a charging process (without losing generality, here we assume that electrode A 14 has a higher potential than electrode B 24, otherwise, this would be a discharging process): lithium ions deintercalate from electrode A 14 and enters the solution in first flow subchannel 18. At the same time, sodium ions in second subchannel 22 intercalate into electrode B 24. Due to increasing cation Li$^+$ concentration in first flow subchannel 18 and decreasing cation Na$^+$ concentration in second subchannel 22, anion OH$^-$ passes through the anion exchange membrane 20 from second subchannel 22 to first flow subchannel 18, which increases the amount of LiOH in first flow subchannel 18. The original and newly generated lithium hydroxide is stored in first tank 28 (see FIG. 2, step 216). The amount of sodium hydroxide in second tank 36 is decreased during the electrochemical procedure. When the average state of charge (SOC) of electrode A 14 (SOC$_A$) decreases to a designed threshold (SOC$_{A,low}$) (see FIG. 2, step 222), or the average SOC of electrode B 24 (SOCK) increases to a designed threshold (SOC$_{B,high}$) (see FIG. 2, step 222), or the amount of lithium hydroxide (quantified by mass, M$_{LiOH}$) reaches a designed value (M$_{LiOH,d}$) (see FIG. 2, step 218), the electrochemical procedure enters state 2. The NaOH may be output for further processing, such as adding NaOH to restore concentration (see FIG. 2, step 224).

In state 2, lithium ions are extracted from brine to intercalate into electrode A 14 while sodium ions absorbed in electrode B 24 are released to the solution. Pure water from water source 62 firstly flows into the electrochemical system 10 to wash out any remaining lithium hydroxide and sodium hydroxide solution to waste tank 64 (see FIG. 2, step 226). Next, valves V-9 and V-10 are opened to let the pre-processed brine into the cell from tank 66 (see FIG. 2, step 228). Then valve V-9 is closed and valve V-11 is opened so that the flow circulates and the cell enters state 2. The pre-processed brine flows into the electrochemical cell at the bottom and flows out at the top, as shown in FIG. 1, panel (b). In state 2, the cell undergoes a discharging process: lithium ions are extracted from brine and intercalate into electrode A 14, while sodium ions deintercalate from electrode B 24. The concentration of lithium ions in the brine decreases with time. When the concentration is below a threshold, the brine stored in the third tank 48 is released, and new pre-processed brine flows into the system 10 from tank 66 to refill tank 48. When the average SOC of electrode A 14 increases to a designed threshold (SOC$_{A,high}$) (see FIG. 2, step 232), or the average SOC of electrode B 24 decreases to a designed threshold (SOC$_{B,low}$) (see FIG. 2, step 232), state 2 is completed (see FIG. 2, step 234) and the system 10 enters state 1. This process is repeated to continuously produce lithium hydroxide.

Electrode A 14 can be selected from lithium host materials, such as lithium manganese oxide (LMO) and lithium titanium oxide (LTO), into and from which lithium ions are able to be intercalated and deintercalated. Electrode B 24 can be selected from sodium host materials, such as sodium manganese oxide (NMO) and sodium titanium oxide (NTO), into and from which sodium ions are able to be intercalated and deintercalated. The anion exchange membrane 20 can be selected from a family of polymers capable of forming membranes having OH$^-$ ionic conductivity such as the polymers described in U.S. Pat. No. 8,641,949.

The system of the present disclosure can be used for the recovery of other first cations from a liquid containing the first cations. For example, electrode A 14 can be selected from magnesium host materials, such as olivine type MgFe-SiO$_4$, into and from which magnesium cations are able to be intercalated (i.e., from a liquid containing the magnesium cations) and deintercalated (i.e., into another liquid).

4. Design Parameters

Effect of Temperature

Figure 4:
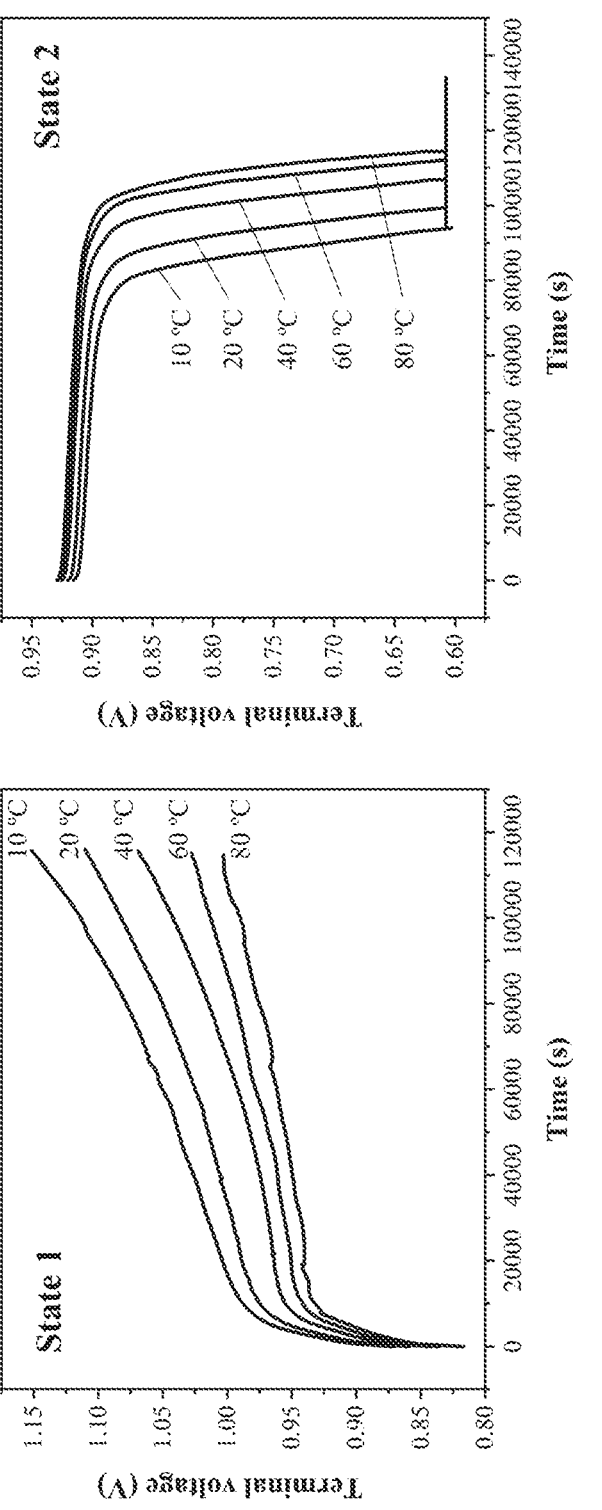
FIG. 4 shows terminal voltage of the electrochemical cell at various temperatures in state 1 (left) and state 2 (right).

Natural geothermal brine has various temperatures, which can be significantly higher than the room temperature (20° C.). Here, the influence of temperature on the performance of lithium hydroxide production and lithium extraction for a specific electrode geometry setup is investigated. The system temperature T is set to be 10° C., 20° C., 40° C., 60° C., and 80° C., respectively. The applied current density for the electrochemical procedure is set to be 20 A/m$^2$ during constant current charging/discharging. The initial SOC of electrode A and electrode B is set to be 0.90 and 0.10, respectively, at the beginning of state 1. The initial and inlet concentration of LiOH (Li$^+$ and OH$^-$) and NaOH (Na$^+$ and OH$^-$) are 500 mol/m$^3$ and 1500 mol/m$^3$, respectively. The terminal voltage of the electrochemical cell is distilled during simulations, which is shown in FIG. 4. It can be seen that in state 1 (lithium hydroxide generation), the terminal voltage of the electrochemical cell decreases significantly with temperature. In state 2 (lithium extraction from brine), the terminal voltage of the electrochemical cell increases significantly with temperature. These suggest that higher temperature leads to lower energy consumption in state 1 and high energy recovery in state 2.

Figure 5:
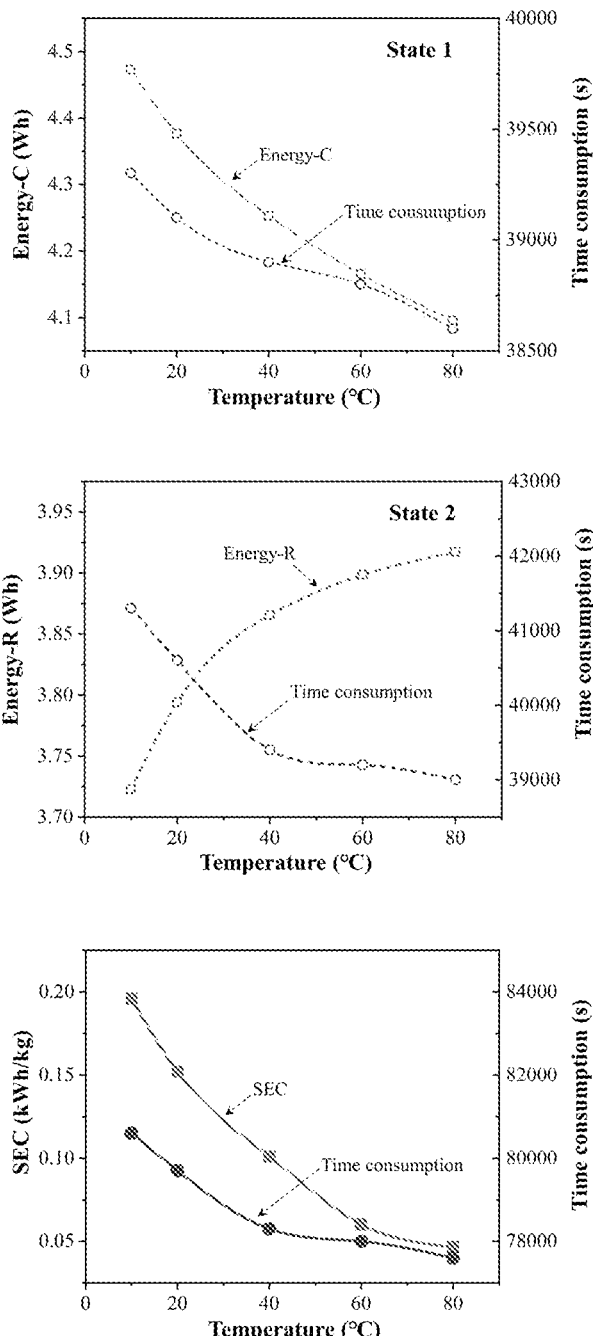
FIG. 5 shows an energy consumption (Energy-C) and processing time in state 1 (top), energy release (Energy-R) and processing time in state 2 (middle), and the specific energy consumption (SEC) and processing time of the whole electrochemical procedure (bottom) at various temperatures.

FIG. 5 shows energy consumption (Energy-C) and processing time in state 1 (top), energy release (Energy-R) and processing time in state 2 (middle), and the specific energy consumption (SEC) and processing time of the whole electrochemical procedure (bottom) at various temperatures. It can be seen that in state 1, the energy consumption decreases significantly with temperature. The energy-C value at 80° C. is 8.48% lower than that at 10° C. The processing time firstly increases slightly and then decreases with temperature. These trends indicate that higher temperature can reduce the energy consumption and processing for lithium hydroxide production. In state 2, the energy release increases with temperature. The energy-R value at 80° C. is 5.26% larger than that at 10° C. The processing time also decreases with temperature. The time used at 80° C. is 5.34% less than that at 10° C. These trends indicate that higher temperature can significantly benefit lithium extraction from brine by promoting energy release and processing speed. It can also be seen that the specific energy consumption of the whole electrochemical procedure decreases significantly with temperature. The SEC at 80° C. is 0.052 kWh/kg-LiOH, which is only 27% of that at 10° C. (0.196 kWh/kg-LiOH). Besides, the total processing time is reduced significantly with temperature. These indicate that higher temperature can significantly improve the system performance.

REFERENCES

1. B. Swain, Recovery and recycling of lithium: A review, *Sep. Purif. Technol.* 172 (2017) 388-403. doi:10.1016/j.seppur.2016.08.031.

2. A. Opitz, P. Badami, L. Shen, K. Vignarooban, A. M. Kannan, Can Li-Ion batteries be the panacea for automotive applications?, *Renew. Sustain. Energy Rev.* 68 (2017) 685-692. doi:10.1016/j.rser.2016.10.019.

3. A. Ebensperger, P. Maxwell, C. Moscoso, The lithium industry: Its recent evolution and future prospects, *Resour. Policy.* 30 (2005) 218-231. doi:10.1016/j.resourpol.2005.09.001.

4. T. Gao, W. Lu, Machine learning toward advanced energy storage devices and systems, *IScience.* 24 (2021) 101936. doi:10.1016/j.isci.2020.101936.

5. J. Rioyo, S. Tuset, R. Grau, Lithium Extraction from Spodumene by the Traditional Sulfuric Acid Process: A Review, *Miner. Process. Extr. Metall. Rev.* 00 (2020) 1-10. doi:10.1080/08827508.2020.1798234.

6. K. J. Kim, Recovery of lithium hydroxide from spent lithium carbonate using crystallizations, *Sep. Sci. Technol.* 43 (2008) 420-430. doi:10.1080/01496390701784088.

7. B. Mishra, G. Majumdar, Alkali metals production (Li, Na, K), (2017).

8. C. A. Young, S M E Mineral Processing and Extractive Metallurgy Handbook, Society for Mining, Metallurgy & Exploration, 2019.

9. M. Grageda, A. Gonzalez, A. Quispe, S. Ushak, Analysis of a process for producing battery grade lithium hydroxide by membrane electrodialysis, *Membranes (Basel).* 10 (2020) 1-21. doi:10.3390/membranes10090198.

10. Y. Zhao, X. Xiang, M. Wang, H. Wang, Y. Li, J. Li, H. Yang, Preparation of LiOH through BMED process from lithium-containing solutions: Effects of coexisting ions and competition between Na+ and Li+, *Desalination.* 512 (2021) 115126. doi:10.1016/j.desal.2021.115126.

11. X. Chen, X. Ruan, S. E. Kentish, G. (Kevin) Li, T. Xu, G. Q. Chen, Production of lithium hydroxide by electrodialysis with bipolar membranes, *Sep. Purif. Technol.* 274 (2021) 119026. doi:10.1016/j.seppur.2021.119026.

12. C. Zhang, J. Ma, L. Wu, J. Sun, L. Wang, T. Li, T. D. Waite, Flow Electrode Capacitive Deionization (FCDI): Recent Developments, Environmental Applications, and Future Perspectives, *Environ. Sci. Technol.* 55 (2021) 4243-4267.

13. K. C. Smith, R. Dmello, Na-Ion Desalination (NID) Enabled by Na-Blocking Membranes and Symmetric Na-Intercalation: Porous-Electrode Modeling, *J. Electrochem. Soc.* 163 (2016) A530-A539. doi:10.1149/2.0761603jes.

14. K. C. Smith, Theoretical evaluation of electrochemical cell architectures using cation intercalation electrodes for desalination, *Electrochim. Acta.* 230 (2017) 333-341. doi:10.1016/j.electacta.2017.02.006.

15. K. Singh, H. J. M. Bouwmeester, L. C. P. M. De Smet, M. Z. Bazant, P. M. Biesheuvel, Theory of Water Desalination with Intercalation Materials, *Phys. Rev. Appl.* 9 (2018) 64036. doi:10.1103/PhysRevApplied.9.064036.

16. E. R. Reale, A. Shrivastava, K. C. Smith, Effect of conductive additives on the transport properties of porous flow-through electrodes with insulative particles and their optimization for Faradaic deionization, *Water Res.* 165 (2019) 114995.

17. M. Son, V. Pothanamkandathil, W. Yang, J. S. Vrouwenvelder, C. A. Gorski, B. E. Logan, Improving the Thermodynamic Energy Efficiency of Battery Electrode Deionization Using Flow-Through Electrodes, *Environ. Sci. Technol.* 54 (2020) 3628-3635. doi:10.1021/acs.est.9b06843.

18. S. Kim, H. Yoon, D. Shin, J. Lee, J. Yoon, Electrochemical selective ion separation in capacitive deionization with sodium manganese oxide, *J. Colloid Interface Sci.* 506 (2017) 644-648. doi:10.1016/j.jcis.2017.07.054.

19. J. Kim, A. Jain, K. Zuo, R. Verduzco, S. Walker, M. Elimelech, Z. Zhang, X. Zhang, Q. Li, Removal of calcium ions from water by selective electrosorption using target-ion specific nanocomposite electrode, *Water Res.* 160 (2019) 445-453. doi:10.1016/j.watres.2019.05.016.

20. S. Porada, L. Zhang, J. E. Dykstra, Energy consumption in membrane capacitive deionization and comparison with reverse osmosis, *Desalination.* 488 (2020) 114383. doi:10.1016/j.desal.2020.114383.

21. M. E. Suss, S. Porada, X. Sun, P. M. Biesheuvel, J. Yoon, V. Presser, Water desalination via capacitive deionization: What is it and what can we expect from it?, *Energy Environ. Sci.* 8 (2015) 2296-2319. doi:10.1039/c5ee00519a.

22. A. Ramachandran, D. I. Oyarzun, S. A. Hawks, M. Stadermann, J. G. Santiago, High water recovery and improved thermodynamic efficiency for capacitive deionization using variable flowrate operation, *Water Res.* 155 (2019) 76-85. doi:10.1016/j.watres.2019.02.007.

23. Y. Ha, H. Bin Jung, H. Lim, P. S. Jo, H. Yoon, C. Y. Yoo, T. K. Pham, W. Ahn, Y. Cho, Continuous lithium extraction from aqueous solution using flow-electrode capacitive deionization, *Energies.* 12 (2019). doi:10.3390/en12152913.

24. R. Zhao, P. M. Biesheuvel, A. Van Der Wal, Energy consumption and constant current operation in membrane capacitive deionization, *Energy Environ. Sci.* 5 (2012) 9520-9527. doi:10.1039/c2ee21737f.

25. Y. Mu, C. Zhang, W. Zhang, Y. Wang, Electrochemical lithium recovery from brine with high Mg2+/Li+ ratio using mesoporous λ-MnO₂/LiMn₂O₄ modified 3D graphite felt electrodes, *Desalination.* 511 (2021). doi:10.1016/j.desal.2021.115112.

26. W. Xu, L. He, Z. Zhao, Lithium extraction from high Mg/Li brine via electrochemical intercalation/de-intercalation system using LiMn₂O₄ materials, *Desalination.* 503 (2021) 114935. doi:10.1016/j.desal.2021.114935.

27. V. C. E. Romero, D. S. Putrino, M. Tagliazucchi, V. Flexer, E. J. Calvo, Sustainable Electrochemical Extraction of Lithium from Natural Brine: Part II. Flow Reactor, *J. Electrochem. Soc.* 168 (2021) 020518. doi:10.1149/1945-7111/abde81.

28. V. C. E. Romero, D. S. Putrino, M. Tagliazucchi, V. Flexer, E. J. Calvo, Electrochemical Flow Reactor for Selective Extraction of Lithium Chloride from Natural Brines, *J. Electrochem. Soc.* 167 (2020) 120522. doi: 10.1149/1945-7111/abace8.

The citation of any document or reference is not to be construed as an admission that it is prior art with respect to the present invention.

Thus, the present invention provides an electrochemical flow cell system for producing lithium hydroxide directly from natural brine by an electrochemical approach.

In light of the principles and example embodiments described and illustrated herein, it will be recognized that the example embodiments can be modified in arrangement and detail without departing from such principles. Also, the foregoing discussion has focused on particular embodiments, but other configurations are also contemplated. In particular, even though expressions such as "in one embodiment", "in another embodiment," or the like are used herein, these phrases are meant to generally reference embodiment possibilities, and are not intended to limit the invention to particular embodiment configurations. As used herein, these terms may reference the same or different embodiments that are combinable into other embodiments. As a rule, any embodiment referenced herein is freely combinable with any one or more of the other embodiments referenced herein, and any number of features of different embodiments are combinable with one another, unless indicated otherwise.

Although the invention has been described in considerable detail with reference to certain embodiments, one skilled in the art will appreciate that the present invention can be used in alternative embodiments to those described, which have been presented for purposes of illustration and not of limitation. Therefore, the scope of the appended claims should not be limited to the description of the embodiments contained herein.

What is claimed is:

1. A system for recovery of a first cation from a liquid containing the first cation, the system comprising:
   a first electrode comprising a first cation host material;
   a second electrode comprising a second cation host material, the first electrode and the second electrode being spaced apart to define a flow channel between the first electrode and the second electrode;
   an anion exchange membrane including an openable portion for shifting the anion exchange membrane into a first state and a second state, wherein in the first state, the flow channel is separated into a first subchannel of the flow channel and a second subchannel of the flow channel such that the first subchannel and the second subchannel are not in fluid communication, wherein in the first state, the first subchannel is in fluid communication with the first electrode, and wherein in the first state, the second subchannel is in fluid communication with the second electrode, and wherein in the second state, the first subchannel and the second subchannel are in fluid communication;
   a first tank in fluid communication with an inlet and an outlet of the first subchannel, the first tank storing a first solution containing the first cation, the first solution being transported through the first subchannel;
   a second tank in fluid communication with an inlet and an outlet of the second subchannel, the second tank storing a second solution containing a second cation, the second solution being transported through the second subchannel; and an electrical device in electrical communication with the first electrode and the second electrode to supply a current to the first electrode and the second electrode, wherein the first cation and the second cation are different.

2. The system of claim 1 wherein:
   the liquid is brine.

3. The system of claim 1 wherein:
   the liquid is a geothermal brine.

4. The system of claim 1 wherein:
   the first cation is lithium, and
   the first cation host material is a lithium host material.

5. The system of claim 4 wherein:
   the lithium host material comprises lithium manganese oxide or lithium titanium oxide.

6. The system of claim 4 wherein:
   the second cation is sodium, and
   the second cation host material is a sodium host material.

7. The system of claim 6 wherein:
   the sodium host material comprises sodium manganese oxide or sodium titanium oxide.

8. The system of claim 1 wherein:
   the first solution is lithium hydroxide.

9. The system of claim 1 wherein:
   the second solution is sodium hydroxide.

10. A system for recovery of a first cation from a liquid containing the first cation, the system comprising:
    a first electrode comprising a first cation host material;
    a second electrode comprising a second cation host material, the first electrode and the second electrode being spaced apart to define a flow channel between the first electrode and the second electrode;
    an anion exchange membrane including an openable portion for shifting the anion exchange membrane into a first state and a second state, wherein in the first state, the flow channel is separated into a first subchannel of the flow channel and a second subchannel of the flow channel such that the first subchannel and the second subchannel are not in fluid communication, wherein in the second state, the first subchannel and the second subchannel are in fluid communication, wherein the first subchannel is in fluid communication with the first electrode, and wherein the second subchannel is in fluid communication with the second electrode,
    a first tank in fluid communication with an inlet and an outlet of the first subchannel, the first tank storing a first solution containing the first cation, the first solution being transported through the first subchannel when the anion exchange membrane is in the first state;
    a second tank in fluid communication with an inlet and an outlet of the second subchannel, the second tank storing a second solution containing a second cation, the second solution being transported through the second subchannel when the anion exchange membrane is in the first state;
    a third tank in fluid communication with an inlet and an outlet of the flow channel, the third tank storing the liquid containing the first cation, the liquid containing the first cation being transported through the flow channel when the anion exchange membrane is in the second state; and
    an electrical device in electrical communication with the first electrode and the second electrode to supply a current to the first electrode and the second electrode.

11. The system of claim 10 further comprising:
    a fourth tank in fluid communication with the first electrode, the second electrode, the flow channel, the first subchannel, and the second subchannel, the fourth tank storing a wash fluid, the wash fluid being transported through the first electrode, the second electrode, the flow channel, the first subchannel, and the second subchannel after the liquid containing the first cation is transported through the flow channel.

12. The system of claim 10 wherein:

the openable portion comprises a door in the anion exchange membrane.

13. The system of claim 10 wherein:

the anion exchange membrane allows hydroxide anions to pass though the anion exchange membrane.

14. The system of claim 10 wherein:

the system generates electricity when the liquid containing the first cation is transported through the flow channel, and the system consumes electricity when the first solution is transported through the first subchannel, and the second solution is transported through the second subchannel.

15. The system of claim 10 wherein:

the electrical device comprises a storage battery, the system generates electricity that is stored in the storage battery when the liquid containing the first cation is transported through the flow channel, and the system consumes electricity from the storage battery when the first solution is transported through the first subchannel, and the second solution is transported through the second subchannel.

16. The system of claim 10 wherein:

the electrical device comprises a resistive load and a power supply to supply the current to the first electrode and the second electrode, the system generates electricity that is provided to the resistive load when the liquid containing the first cation is transported through the flow channel, and the system consumes electricity from the power supply when the first solution is transported through the first subchannel, and the second solution is transported through the second subchannel.

17. A system comprising a plurality of systems according to claim 10.

18. The system of claim 17 wherein:

one of the plurality of systems generates electricity during a time period, and another of the plurality of systems consumes electricity generated by the one of the plurality of systems during the time period.

19. The system of claim 1 wherein:

the openable portion comprises a door in the anion exchange membrane.

* * * * *